(No Model.)
J. S. SMITH.
Velocipede.
No. 230,669. Patented Aug. 3, 1880.
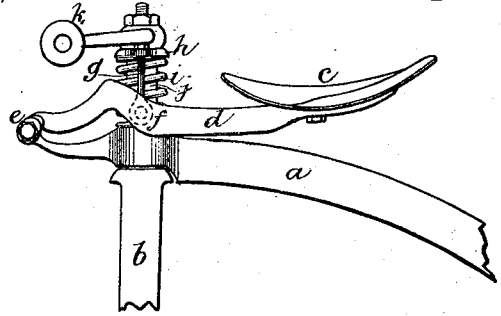
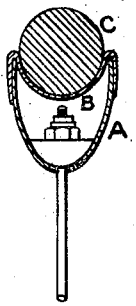
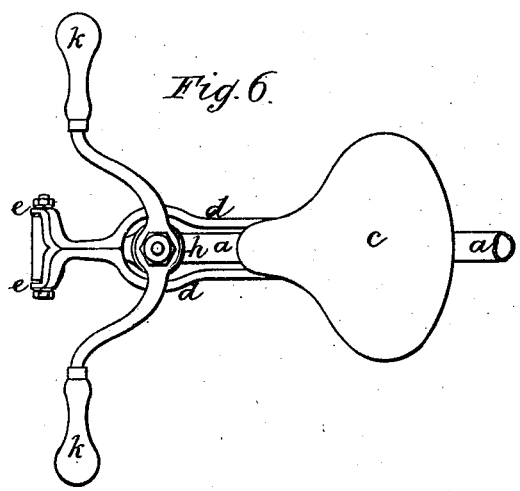
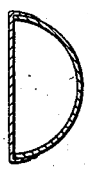
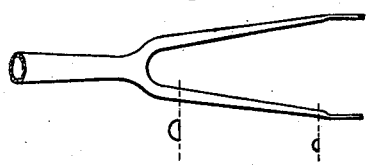
Witnesses. Inventor.

UNITED STATES PATENT OFFICE.

JOHN SAMUEL SMITH, OF LONDON, ENGLAND.

VELOCIPEDE.

SPECIFICATION forming part of Letters Patent No. 230,669, dated August 3, 1880.

Application filed April 23, 1880. (No model.) Patented in England December 10, 1877.

*To all whom it may concern:*

Be it known that I, JOHN SAMUEL SMITH, of London, England, have invented certain new and useful Improvements in Bicycles, part of such improvements being applicable to tricycles and other light vehicles, (for which I have obtained a patent in Great Britain, No. 4,687, bearing date December 10, 1877,) of which the following is a specification.

This invention has mainly for its object improvements in bicycles.

In the construction of the wheels, in order to combine stiffness with lightness, I form the rim or felly of the wheel, which receives the india-rubber tire, of two metal rings, each of trough-like section. The outer ring may be semicircular in section, and of suitable size to receive the india-rubber into its concavity. The inner ring is considerably deeper in its concavity, and the spokes of the wheel pass through its bottom and are there secured. The two troughs are connected together by their edges, so that they form, when so connected, a tubular ring or felly, which, from its form and structure, is very stiff and light.

Figure 1 of the drawings hereunto annexed shows a transverse section taken through the rim or felly of a wheel formed as above described.

A is the inner concave ring; B, the outer concave ring, into which is cemented the vulcanized india-rubber tire C. The edges of the ring B are, as shown by the drawings, bent over the edges of the ring A, and are soldered to this ring.

Holes are bored in the fellies at suitable points to admit of inserting the spokes therein, and after these have been put into their places the outer tire of rubber is cemented on.

The space between the inner and outer rings, A and B, may either be left hollow or be filled in with wood or other material.

These improvements in wheels are applicable to the wheels of tricycles and other light vehicles.

I make the forks of bicycles, which embrace the wheels and carry the bearings for their axes, by splitting a tube, which also serves to form the stem or portion of the frame of which the fork is a prolongation. In this way I avoid the necessity for welding or brazing in forming these parts, and produce them from one piece of metal. Fig. 2 shows an elevation of a fork formed in this manner, which embraces the main driving-wheel and carries its bearings. Fig. 3 shows, on a larger scale, a transverse section through one of the limbs or prongs of this fork. It is formed by cutting a long tapering slot into a parallel-sided tube and afterward closing together the edges of each of the limbs, so as to make them approximately hemispherical in cross-section at all parts of their length. The hollow limbs so formed are then closed in by thin plates of steel, tin-plate, or other metal, which are made to overlap the edges of the hollow limbs and are soldered or brazed to them.

In place of the hollow tapering limbs of the forks being made from a parallel-sided tube by cutting a tapering slot in it, the limbs of the fork may be formed by cutting a straight slit along the center of a tapering tube.

After the limbs of the fork have been opened out to the required extent, as shown at Fig. 2, the cross-piece B', which receives the lower end of the vertical pivot at the extremity of the backbone of the machine, is riveted and brazed in its place. The bearing for the upper end of the vertical pivot is in a screw-cap which screws into the upper end of the tube A. C are the handles projecting from a collar, which is secured to the exterior of the tube A.

In the same way to that above described I form the fork at the lower end of the tubular backbone of the machine, and which carries the bearings of the hinder or small wheel.

Fig. 4 shows an elevation of the fork at the lower end of the ordinary tubular backbone, a portion only of the backbone being shown in the drawings.

My improvements in bicycles further consist in an improved method of suspending the saddles of bicycles, and will be understood by reference to Figs. 5 and 6 of the accompanying drawings, which represent an elevation and plan showing this part of my invention.

*a* is the backbone, and *b* the fork, of ordinary construction. *c* is the ordinary saddle, which is carried by the two-armed or branching lever *d*, which is pivoted at *e* to the front end of the backbone, which extends some distance in front of the fork *b*, so that the fulcrum is at the forward extremity of the lever, which is hence a lever of the second order, and the leverage is a long one, and the weight of the rider is always eased by the spring, which is always under compression when the vehicle is in use, thus preventing shocks. Each of the arms of the lever $d$ is jointed, at $f$, to a bolt, $g$, connected to the collar $h$, placed on the top of a strong spiral spring, $i$, fitted over the steering-head $j$, which carries the handles $k\,k$. By this arrangement it will be seen that the weight of the rider is supported by the spiral spring $i$, whereby the usual shocks to the rider are avoided and the vibration diminished from the elasticity of the spring. At the same time the lever $d$, being formed with two arms which can pass over the backbone, allows of the saddle being placed closer to the backbone, and consequently to the driving-wheel.

Having thus described the nature of my invention and the manner of performing the same, I would have it understood that I claim as my improvements in bicycles—

1. In the rims or fellies of a bicycle, tricycle, or other light vehicle made of two rings trough-like in cross-section, the attachment of the spokes thereto by projecting their outer ends through the inner ring only and securing the same within the tubular space between the rings.

2. Forks of bicycles which embrace the wheels and carry the bearings for their axes made from split tubes, substantially as herein described.

3. The described means for suspending the saddles of bicycles and similar vehicles, the same consisting in the combination of a backbone projecting forward of the yoke, the saddle-lever fulcrumed at its forward end and forward of the yoke to such projection, the bolts jointed to such lever at points between the fulcrum and saddle, and a spiral spring upon which said bolts are suspended.

JOHN SAMUEL SMITH.

Witnesses:
A. ALBUTT,
G. F. REDFERN.